United States Patent [19]

Orthman

[11] 3,831,536
[45] Aug. 27, 1974

[54] SEEDBED AND METHOD AND MEANS FOR PREPARING SAME

[75] Inventor: Henry K. Orthman, Lexington, Nebr.

[73] Assignee: Orthman Manufacturing, Inc., Lexington, Nebr.

[22] Filed: Aug. 14, 1972

[21] Appl. No.: 280,729

Related U.S. Application Data

[63] Continuation-in-part of Ser. No. 104,405, Jan. 6, 1971.

[52] U.S. Cl. .................................................. 111/1
[51] Int. Cl. ............................................ A01c 1/00
[58] Field of Search ............... 111/1, 85, 86, 72, 73, 111/DIG. 1

[56] References Cited
UNITED STATES PATENTS

| | | | |
|---|---|---|---|
| 3,335,681 | 8/1967 | Main et al. | 111/73 X |
| 3,664,279 | 5/1972 | Belden | 171/85 X |

Primary Examiner—Stephen C. Pellegrino
Attorney, Agent, or Firm—Zarley, McKee, Thomte & Voorhees

[57] ABSTRACT

A tool bar having a plurality of spaced apart ground working assemblies including a furrowing shovel with outwardly and rearwardly extending vertically adjustable mold boards on opposite sides thereof. The outer ends of the mold boards have an upper convex forwardly rounded surface and a rear edge which extends forwardly and downwardly and meets at a vertex with an upwardly and longitudinally inwardly extending rear edge on a cutting blade extending along the bottom of the mold board. The mold boards are supported independently of the furrowing shovel and the outer ends of adjacent mold boards are closely spaced to form a ridge such that seed is planted on a ledge between the valley formed by the furrowing shovel and the ridge formed by adjacent mold boards. The ground working assemblies may be spaced apart to provide alternate spacing between rows of 20 and 30 inches with the ridges being on the centerline of the 30 inch spacing and the troughs being on the centerline of the 20 inch rows. A wheel having a V-shape in cross section peripheral edge may be mounted on the tool bar for forming a small trough in the ridge. The small trough has a bottom higher in elevation than the ledge on which the seed is planted. The method of producing row crops includes planting the seed of the first crop in rows utilizing the alternate narrow and wide spacing, harvesting the crop and planting the seed for the second crop with the wide rows having the same centerline as the narrow rows of the first crop and the narrow rows of the second crop having the same centerline as the wide rows of the first crop. The root structure of the first crop is left in the ground to help prevent soil erosion and allow for more time to decay.

3 Claims, 12 Drawing Figures

SEEDBED AND METHOD AND MEANS FOR PREPARING SAME

This is a continuation in part application on my co-pending application Ser. No. 104,405 filed Jan. 6, 1971, on a SEEDBED SPLITTER AND SHAPER.

The typical ground preparation for planting of corn involves use of a conventional plow followed by disking, harrowing and planting. A generally level bed surface is used. In areas where irrigation is necessary it has been found that the seedbed splitter and shaper of this invention provides a more preferred and suitable seedbed which includes an irrigation trough or valley below a ledge for planting seed which in turn is below a ridge of turned over crop from the previous season. The next season the seedbed sequence is reversed such that a ridge is formed in the valley and a valley is formed in place of each of the ridges with the seed being planted between the valley and the ridges. First, a bed splitter is passed over the soil after the cornstalks have been chopped by a cornstalk chopper or the like and then this is followed by the same seedbed preparation machine which functions then as a seedbed shaper in final preparation for the planting of the seed. The seedbed shaper differs from the seedbed splitter by the rearwardly and outwardly extending mold boards on opposite sides of the furrowing shovel being located lower on the splitter than on the shaper.

The forming of the ridges between the trailing ends of the mold boards of each of the ground working assemblies, makes it necessary to place the trailing edges close together and a resulting problem is the gathering of cornstalk trash as opposed to the formation of a smooth and rounded ridge of turned over soil. The specific shape of the mold board and cutting blade of the oppositely disposed mold boards of each ground working assembly has overcome this problem and results in a smooth rounded ridge between each seed ledge. The outer edge of the blade angles upwardly and longitudinally inwardly and meets the lowermost point on the mold board which extends from there upwardly and longitudinally outwardly. The upper rear corner of the mold board is rounded to form a convex forwardly surface which allows the soil and stalk debris cut by the cutting blade to flow smoothly along and over the mold board to form the nicely rounded ridge and eliminate the problem of debris gathering between adjacent outer ends of mold boards and clogging up the implement.

It has been found that additional moisture can be made available for the plant roots if a small trough is formed on the centerline of the ridge and thus a wheel is provided which has a V-shape in cross section peripheral edge for engagement with the ridge to form the shallow trough. This trough will hold moisture and feed it to the root structure.

It has been further found that literally one-trip farming can be a realization if the root structure of the first crop is left in the ground and the new rows of seed are planted adjacently. Not only does the root structure have additional time to decompose, but it helps to prevent soil erosion. Spacing of the working tools is such that the rows are alternately 20 and 30 inches on center and the second year the ridge is on the centerline of the trough of the first year and the trough of the second year is on the centerline of the ridge of the first year. Accordingly the centerline of the 30 inch rows is on the centerline of the 20 inch rows and the 20 inch rows now have the centerline of the 30 inch rows in moving from one year to the next. In each case the seed is planted on the ledge between the trough and the ridge. This method of producing row crops and particularly corn requires but a single field operation to prepare the seedbed and plant the seed. The corn is harvested in the usual fashion and if desired the stalks may be broken with a stalk cutter. The usual plowing, disking, and harrowing operations are not required.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
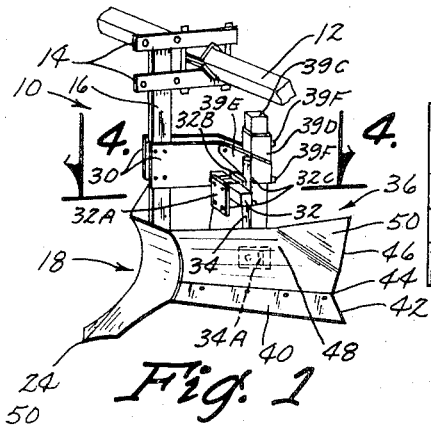
FIG. 1 is a perspective view of the ground working assembly of this invention.

The seedbed splitter and shaper of this invention is referred to generally in FIG. 1 by the reference numeral 10 and is shown carried on a tool bar 12 and held in place by horizontally disposed clamping members 14 which are adjustable to position the unit in the desired position. It is understood that a series of units of this design will be carried on the tool bar 12 to work the ground and prepare the seedbed.

A shank 16 extends downwardly from the members 14 and carries at its lower end a furrowing shovel 18 having a concave forward face with rearwardly extending wings 20 converging along a vertical centerline 22 and providing a pointed lower end 24. The shovel 18 includes an upper section 26 which functions as a trash shield in cooperation with the lower blade portion 28 as seen in FIG. 6.

A pair of rearwardly extending plates 30 are connected to the shank 16 and support at their rear end a cross member 32 having downwardly extending shanks 34 detachably connected thereto. A pair of oppositely disposed mold board units 36 are carried on the lower ends of the shanks 34 and are interconnected by an extendable cross member 38 which includes a female member 38A having oppositely extending threaded male members 39 adjustably locked in place by lock nuts 39A. The ends of the male members 39 are pivotally connected to ears 39B on the back side of the mold board units 36. An upstanding rectangular in cross section post 39C is provided on the female cross member 38A and is telescopically received in a sleeve 39D pivotally connected by forwardly extending ears 39E to the rearwardly extending plates 30. A pair of set screws 39F are provided along the far edge of the sleeve 39D in order to bear directly against a side wall of the upstanding post 39C and thereby more positively maintain the post in place.

The connection of the upstanding post 34 to the cross members 32 includes front and rear bearing or clamping plates 32A and 32B, respectively, held together on opposite sides of the cross member 32 by top and bottom U-bolts 32C. The mold board units 36 include a detachable blade 40 which has a rear edge 42 extending longitudinally inwardly and upwardly to a vertex point 44 where the rear edge 46 of the mold board section 48 merges. This rear edge 46 extends downwardly and longitudinally inwardly such that a V-shaped notch is formed in the rear edge of the mold board unit. The upper rear corner 50 of the mold board is convex forwardly as seen in FIGS. 2 and 3.

Figure 5:
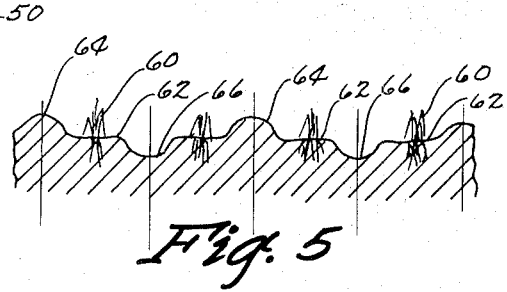
FIG. 5 illustrates the seedbed after harvesting and prior to being worked by the bed splitter.
Figure 6:
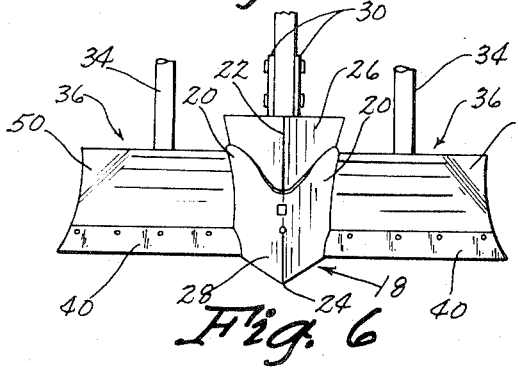
FIG. 6 is a front elevational view of the ground working assembly with the oppositely disposed mold board's position lower for the unit to function as a bed splitter.
Figure 7:
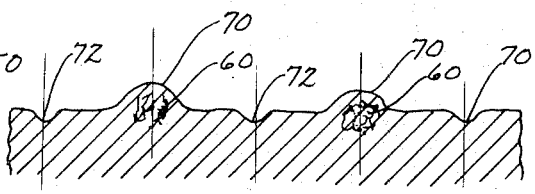
FIG. 7 illustrates the seedbed in cross section after the bed splitter of FIG. 6 has worked the ground illustrated in FIG. 5.
Figure 8:
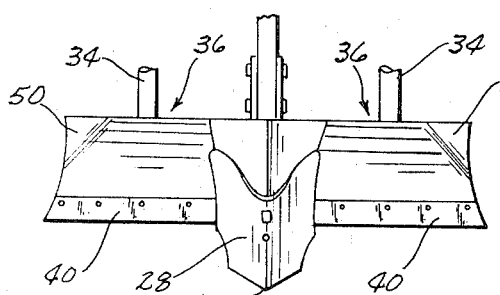
FIG. 8 is a front elevational view similar to FIG. 6 but illustrating the mold boards in a raised position for the ground working unit to function as a bed shaper.
Figure 9:
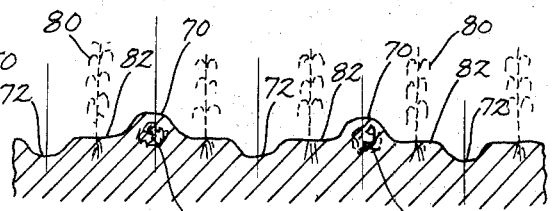
FIG. 9 is a cross sectional view of the bed contour after the bed shaper of FIG. 8 has worked the ground of FIG. 7.

In general the procedure followed in preparing a seedbed by the use of the splitter and shaper unit of this invention is that after the corn has been harvested the stalks are cut by a shredding machine and then the splitter is used on the ground as seen in FIG. 6 wherein the mold board units 36 are lowered vertically relative to the furrowing shovel 18. The stalks of corn 60 in FIG. 5 on the seed ledges 62 between the ridges 64 and the irrigation troughs or valleys 66, are sheared off and moved over to the area of the troughs and thus new ridges 70 are formed as seen in FIG. 7 with new troughs 72 in line with the former ridges 64. Next the bed shaper, as seen in FIG. 8, is used and the shaper differs from the splitter by the fact that the mold board units 36 have been raised. During the shaping operation a planter unit also seeds the soil with corn seed which will produce a new crop of corn 80 on the ledge 82 between the troughs 72 and the ridges 70. The adjustment between the splitter and shaper arrangements in FIGS. 6 and 8 is easily accomplished by the shanks 34 being adjustably connected to the cross member 32, as seen in FIG. 1.

It is understood that as the splitter or shaper unit moves through the ground it is accompanied by a series of units in side by side relationship such that the ridges 70 are formed by the adjacent ends of the mold boards 36. It is necessary to form these ridges 70 but it is only possible to smoothly form them if the configuration of the outer edge of the mold board is as shown in FIGS. 2 and 3 wherein the upper rear corner 50 is convex forwardly and the rear edge is V-shaped with the blade 40 having the edge 42 tapering longitudinally inwardly and upwardly and being met by the downwardly and longitudinally inwardly tapering mold board rear edge. This allows the trash to smoothly roll off of the mold board and not pile up between adjacent mold boards. Also, a smooth and not ragged ledge 82 is provided which makes the planting operation much simpler.

Figures 2, 3:
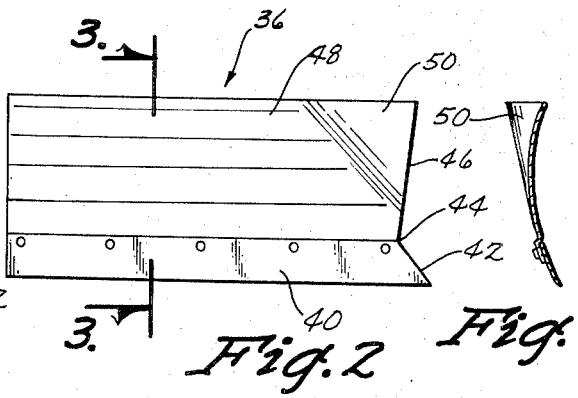
FIG. 2 is a front elevational view of the mold board of the ground working assembly.
FIG. 3 is a cross sectional view taken along line 3—3 in FIG. 2.
Figure 4:
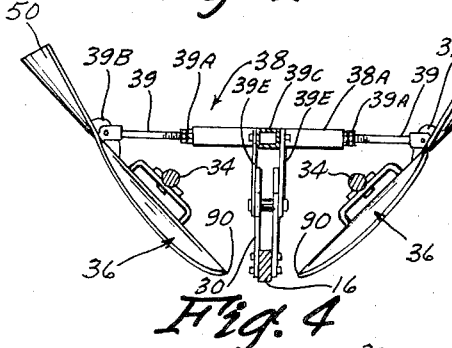
FIG. 4 is a top view of the oppositely disposed and extending mold boards in the ground working assembly.

It is seen in FIG. 2 that the rearmost point in the upper rear corner of the mold board 48 is in a vertical plane longitudinally inwardly of the rearmost point on the rear edge 42 of the blade 40.

It is seen that the support structure for the mold boards 36 provides unlimited adjustability. The mold boards may be readily lowered or raised by adjusting the U-bolts 32C on the upstanding posts 34 along with similar adjustment being made through the set screws 39F engaging the upstanding posts 39C. The angularity of the rearwardly extending mold boards relative to the ground may be varied due to the ability of them to pivot on the upstanding post 39C pivotally connected to the rearwardly extending plates 30. A pair of bolts connect the lower end of the upstanding post 34 to the mold board units 36 and the rearmost bolt opening 34A is elongated vertically to permit the pivotal movement. The angularity between the rearwardly extending mold board units 36 may be varied by extending or retracting the male threaded members 39 relative to the female cross member 38A. It is seen that this three point connection of the two mold board units 36 to the tool bar frame member 12 gives maximum strength and adjustability without any connection being made between the forward ends 90 to the furrowing shovel 18. Instead the forward ends 90 are merely positioned behind the rearwardly extending furrowing shovel wings 20.

Figure 10:
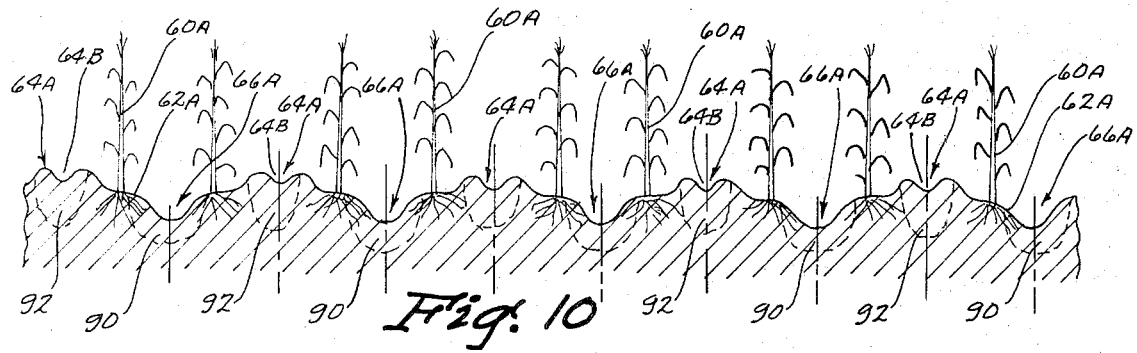
FIG. 10 is a cross sectional view of the seedbed for the first crop of corn.
Figure 12:
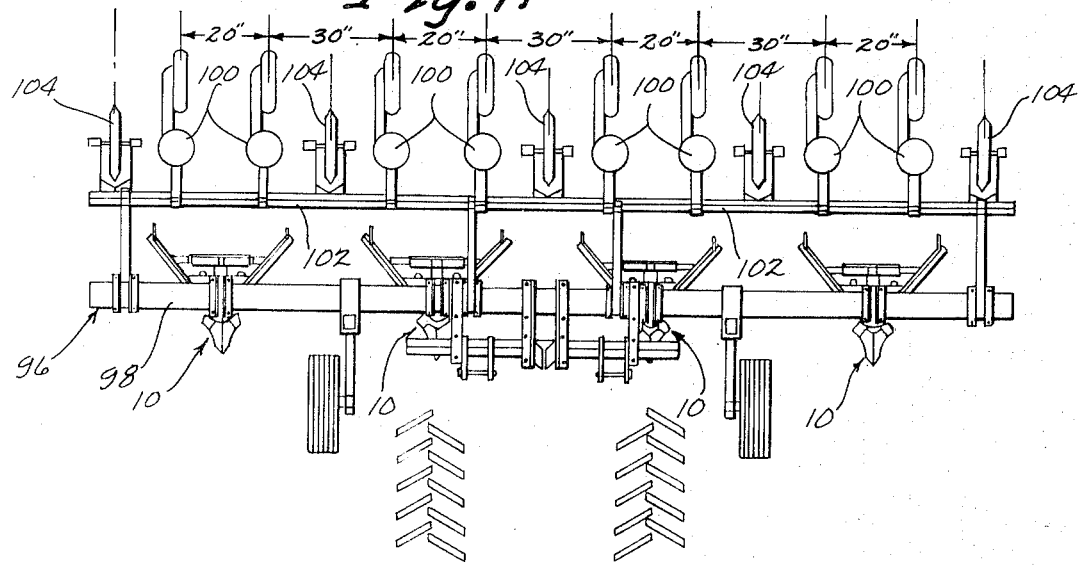
FIG. 12 is a top plan view of the implement used to prepare the seedbed and plant the seed.

An alternate seedbed is shown in FIG. 10 wherein the ridges 64A include small troughs 62B. The corn 60A is planted on the ledge 62A next to the trough 66A. As seen in FIG. 12, the spacing between the rows on opposite sides of the trough 66A is 20 inches while the spacing between the rows having the ridge 64A on the centerline is 30 inches.

Figure 11:
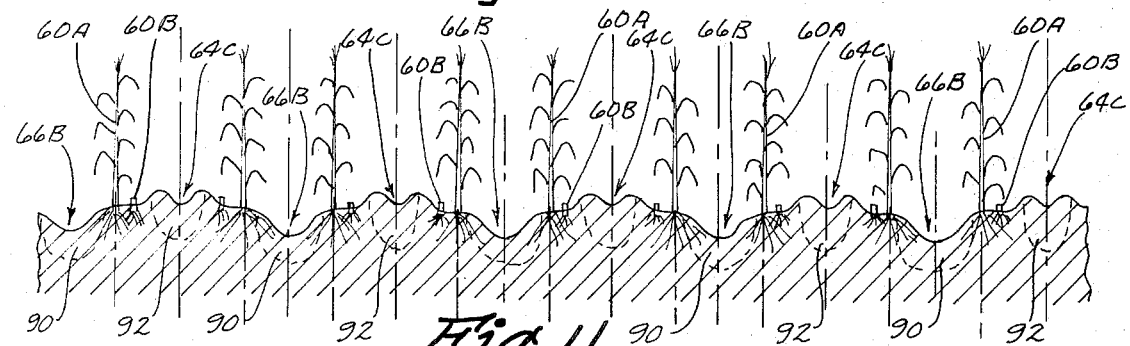
FIG. 11 is a cross sectional view of the seedbed for the second crop of corn.

The second crop as seen in FIG. 11 is planted after the corn 60A has been harvested leaving behind the root structure 60B. In preparing for the second planting, the ridge 64C is now where the trough 66A was for the first crop in FIG. 10. Similarly, the valley 66B is where the ridge 64A formerly was. The spacing between the rows on opposite sides of the ridge 64C remains at 30 inches while the spacing between the rows on opposite sides of the trough 66B is 20 inches. The root structure 60B remains in the ground from the previous crop and is allowed to decay one more year and also functions to prevent soil erosion. The third year the rows would appear as in the first year in FIG. 10 and the root structure 60B would be displaced in the seedbed preparation.

It is further seen in FIGS. 10 and 11 that the trough 66A distributes moisture to the surrounding area 90 while the smaller trough 62B on the ridge 64A distributes moisture to an area 92 and thus moisture is more uniformly supplied to the roots of the new plants 60A.

An implement 96 is shown in FIG. 2 which utilizes for seedbed splitters and shapers 10 which are carried on a tool bar 98. Planter units 100 are mounted on a tool bar 102. The depression or trough 62B is formed by a wheel 104 having a peripheral edge V-shaped in cross section.

Thus it is seen that the implement 96 accomplishes in one operation the preparation of this seedbed and the planting and only the harvesting is required between these operations. It is understood that the spacing between the adjacent rows while preferably 20 and 30 inches could be varied to utilizes the method of producing row crops contemplated by this invention.

I claim:

1. The method of sequentially producing two row crops comprising the steps of:
   planting the seed of the first crop in rows having narrow and wide spacing and a ridge being provided on the centerline of the rows having wide spacing and a trough being provided on the centerline of the rows having narrow spacing,
   harvesting the first row crop, and
   planting the seed for the second row crop with alternately narrow and wide spacing between rows with the rows having wide spacing having the same centerline as the rows having narrow spacing of the first crop and the narrow rows of the second crop having the same centerline as the wide rows of the first crop, and a ridge being provided on the centerline of the rows having wide spacing and a trough being provided on the centerline of the rows having narrow spacing.

2. The method of claim 1 wherein the root structure is left in the ground between the planting of the first and second crops to prevent soil erosion and allow the root structure maximum time to decay.

3. The method of claim 2 wherein a small trough is provided on the centerline between the wide rows, and on the ridge.

* * * * *